United States Patent
Cote et al.

(10) Patent No.: US 7,087,173 B2
(45) Date of Patent: *Aug. 8, 2006

(54) INVERTED CAVITY AERATOR FOR MEMBRANE MODULE

(75) Inventors: Pierre Lucien Cote, Dundas (CA); Steven Kristian Pedersen, Burlington (CA); Henry Behmann, Puslinch (CA)

(73) Assignee: ZENON Environmental Inc., Oakville (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/841,440

(22) Filed: May 10, 2004

(65) Prior Publication Data

US 2005/0006308 A1   Jan. 13, 2005

Related U.S. Application Data

(60) Continuation-in-part of application No. 10/661,519, filed on Sep. 15, 2003, and a continuation-in-part of application No. 10/171,997, filed on Jun. 17, 2002, which is a continuation-in-part of application No. 10/061,108, filed on Feb. 1, 2002, now abandoned, which is a continuation of application No. 09/849,573, filed on May 4, 2001, now Pat. No. 6,620,319, which is a continuation of application No. 09/507,438, filed on Feb. 19, 2000, now Pat. No. 6,294,039, which is a division of application No. 09/258,999, filed on Feb. 26, 1999, now Pat. No. 6,042,677, which is a division of application No. 08/896,517, filed on Jun. 16, 1997, now Pat. No. 5,910,250, and a continuation-in-part of application No. 08/690,045, filed on Jul. 31, 1996, now Pat. No. 5,783,083, which is a continuation-in-part of application No. 08/514,119, filed on Aug. 11, 1995, now Pat. No. 5,639,373.

(60) Provisional application No. 60/278,007, filed on Mar. 23, 2001, provisional application No. 60/012,921, filed on Mar. 5, 1996.

(51) Int. Cl.
 B01D 61/00   (2006.01)
 B01D 65/02   (2006.01)

(52) U.S. Cl. ........................ 210/650; 210/636

(58) Field of Classification Search ............. 210/636, 210/650, 321.8, 321.69; 261/59, 64.1, 124
See application file for complete search history.

(56) References Cited

U.S. PATENT DOCUMENTS 2,995,497 A   8/1961   Heden (Continued)

FOREIGN PATENT DOCUMENTS

DE   19502516   1/1997

(Continued)

OTHER PUBLICATIONS

Kaiya et al., "Water Purification Using Hollow Fiber Microfiltration Membranes", 6th World Filtration Congress, Nagoya, 1993, pp. 813-816.

(Continued)

*Primary Examiner*—Ana Fortuna
(74) *Attorney, Agent, or Firm*—Bereskin & Parr

(57) ABSTRACT

An aerator for immersed filtering membranes has an aerator shell with openings for discharging bubbles from its upper surface and a shape capable of temporarily containing a volume of air in fluid communication with the openings. The shell is open to tank water below it and located so that discharged bubbles will rise through an assembly of the filtering membranes. The shell may be wholly or partially made of parts of the assemblies of filtering membranes. A supply of air is provided to the air space in the aerators alternating between a high flow rate and a low flow rate in short cycles of between about 10 seconds and 100 seconds. A filtration system has an inlet for adding substrate and an outlet for retentate are located so as to create a horizontal flow of substrate through the tank. Membrane assemblies are located within the horizontal flow of substrate. Aerators as described above are provided and operated as described above.

4 Claims, 7 Drawing Sheets

U.S. PATENT DOCUMENTS

| | | | |
|---|---|---|---|
| 3,704,223 A | 11/1972 | Dietzch et al. | |
| 3,708,071 A | 1/1973 | Crowley | |
| 3,730,959 A | 5/1973 | Horres | |
| 3,794,169 A | 2/1974 | Sisk et al. | |
| 3,853,756 A | 12/1974 | Stana | |
| 3,992,301 A | 11/1976 | Shippey et al. | |
| 4,075,100 A | 2/1978 | Furuta et al. | |
| 4,414,113 A | 11/1983 | LaTerra | |
| 4,540,490 A | 9/1985 | Shibata et al. | |
| 4,605,500 A | 8/1986 | Takemura et al. | |
| 4,647,377 A | 3/1987 | Miura | |
| 4,668,401 A | 5/1987 | Okumura et al. | |
| 4,707,268 A | 11/1987 | Shah et al. | |
| 4,756,875 A | 7/1988 | Tajima et al. | |
| 4,775,471 A | 10/1988 | Nagai et al. | |
| 4,876,006 A | 10/1989 | Ohkubo et al. | |
| 4,886,601 A | 12/1989 | Iwatsuka et al. | |
| 4,915,833 A | 4/1990 | Iwatsuka et al. | |
| 5,035,799 A | 7/1991 | Rosberg et al. | |
| 5,133,862 A | 7/1992 | Cannan et al. | |
| 5,141,031 A | 8/1992 | Baurmeister | |
| 5,151,191 A | 9/1992 | Sunaoka et al. | |
| 5,192,456 A * | 3/1993 | Ishida et al. | 210/791 |
| 5,209,852 A | 5/1993 | Sunsoka et al. | |
| 5,248,424 A | 9/1993 | Cote et al. | |
| 5,366,625 A | 11/1994 | Pedersen et al. | |
| 5,403,479 A | 4/1995 | Smith et al. | |
| 5,451,317 A | 9/1995 | Ishida et al. | |
| 5,480,553 A | 1/1996 | Yamamori et al. | |
| 5,482,625 A | 1/1996 | Shimizu et al. | |
| 5,484,528 A | 1/1996 | Yagi et al. | |
| 5,584,997 A | 12/1996 | Yagihashi et al. | |
| 5,607,593 A | 3/1997 | Cote et al. | |
| 5,639,373 A | 6/1997 | Mahendran et al. | |
| 5,643,455 A | 7/1997 | Kopp et al. | |
| 5,647,988 A | 7/1997 | Kawanishi et al. | |
| 5,716,519 A | 2/1998 | Schleife et al. | |
| 5,783,083 A | 7/1998 | Henshaw et al. | |
| 5,790,360 A * | 8/1998 | Ryan | 361/111 |
| 5,910,250 A * | 6/1999 | Mahendran et al. | 210/636 |
| 5,932,099 A | 8/1999 | Cote et al. | |
| 5,944,997 A | 8/1999 | Pedersen et al. | |
| 5,989,428 A | 11/1999 | Goronszy | |
| 6,042,677 A | 3/2000 | Mahendran et al. | |
| 6,045,698 A | 4/2000 | Cote et al. | |
| 6,139,411 A * | 10/2000 | Everts et al. | 451/359 |
| 6,156,200 A | 12/2000 | Zha et al. | |
| 6,193,890 B1 | 2/2001 | Pedersen et al. | |
| 6,199,835 B1 | 3/2001 | Chang et al. | |
| 6,214,231 B1 | 4/2001 | Cote et al. | |
| 6,245,239 B1 | 6/2001 | Cote et al. | |
| 6,280,626 B1 | 8/2001 | Miyashita et al. | |
| 6,284,135 B1 * | 9/2001 | Ookata | 210/220 |
| 6,294,039 B1 * | 9/2001 | Mahendran et al. | 156/242 |
| 6,303,035 B1 | 10/2001 | Cote et al. | |
| 6,319,411 B1 | 11/2001 | Cote | |
| 6,325,928 B1 * | 12/2001 | Pedersen et al. | 210/232 |
| 6,325,938 B1 | 12/2001 | Miyashita et al. | |
| RE37,549 E * | 2/2002 | Mahendran et al. | 210/636 |
| 6,402,955 B1 * | 6/2002 | Ookata | 210/636 |
| 6,478,964 B1 | 11/2002 | Redmon | |
| 6,524,481 B1 | 2/2003 | Zha et al. | |
| 6,555,005 B1 | 4/2003 | Zha et al. | |
| 6,620,319 B1 * | 9/2003 | Behmann et al. | 210/321.69 |
| 6,641,733 B1 | 11/2003 | Zha et al. | |
| 6,682,652 B1 * | 1/2004 | Mahendran et al. | 210/195.2 |
| 6,841,070 B1 | 1/2005 | Zha et al. | |

FOREIGN PATENT DOCUMENTS

| | | |
|---|---|---|
| DE | 10045227 C1 | 2/2002 |
| EP | 0427376 | 5/1991 |
| EP | 0 598 909 A1 | 6/1994 |
| EP | 0 734 758 | 10/1996 |
| EP | 1213048 | 6/2002 |
| GB | 2120952 A | 12/1983 |
| JP | 61-107905 | 5/1986 |
| JP | 61-157306 | 7/1986 |
| JP | 61-167407 | 7/1986 |
| JP | S63-38884 | 7/1986 |
| JP | 61-192309 | 8/1986 |
| JP | 61-197005 | 9/1986 |
| JP | 61-242607 | 10/1986 |
| JP | 61-263605 | 11/1986 |
| JP | 61-291007 | 12/1986 |
| JP | 61-293504 | 12/1986 |
| JP | 62-004408 | 1/1987 |
| JP | 62-114609 | 5/1987 |
| JP | 62-144712 | 6/1987 |
| JP | 62-201610 | 9/1987 |
| JP | 62-250908 | 10/1987 |
| JP | 63-143905 | 6/1988 |
| JP | 01-293103 | 11/1989 |
| JP | 02-095422 | 4/1990 |
| JP | 02-164423 | 6/1990 |
| JP | 02-191531 | 7/1990 |
| JP | 02-293093 | 12/1990 |
| JP | 03-000114 | 1/1991 |
| JP | 03-131324 | 6/1991 |
| JP | 04-126528 | 4/1992 |
| JP | 04-131182 | 5/1992 |
| JP | 04-180821 | 6/1992 |
| JP | 04-197487 | 7/1992 |
| JP | 04-247295 | 9/1992 |
| JP | 04-250898 | 9/1992 |
| JP | 05-285348 | 2/1993 |
| JP | 05-154362 | 6/1993 |
| JP | 05-154476 | 6/1993 |
| JP | 05-184884 | 7/1993 |
| JP | 05-285349 | 11/1993 |
| JP | 06-023245 | 2/1994 |
| JP | 06-218237 | 8/1994 |
| JP | 06-218238 | 8/1994 |
| JP | 06-218361 | 8/1994 |
| JP | 06-277664 | 10/1994 |
| JP | 06-285496 | 11/1994 |
| JP | 06-343837 | 12/1994 |
| JP | 07-000770 | 1/1995 |
| JP | 07-024272 | 1/1995 |
| JP | 07-047245 | 2/1995 |
| JP | 07-116482 | 5/1995 |
| JP | 07-136470 | 5/1995 |
| JP | 07-136471 | 5/1995 |
| JP | 09-132213 | 5/1995 |
| JP | 07-185268 | 7/1995 |
| JP | 07-227526 | 8/1995 |
| JP | 07-275665 | 10/1995 |
| JP | 07-289860 | 11/1995 |
| JP | 08-010585 | 1/1996 |
| JP | 08-131785 | 5/1996 |
| JP | 08-206472 | 8/1996 |
| JP | 08-281082 | 10/1996 |
| JP | 09-138298 | 5/1997 |
| JP | 09-141063 | 6/1997 |
| JP | 09-192688 | 7/1997 |
| JP | 09-220569 | 8/1997 |
| JP | 09-248432 | 9/1997 |
| JP | 09-290261 | 11/1997 |
| JP | 09-308882 | 12/1997 |
| JP | 08-252438 | 10/1998 |
| JP | 10-277599 | 10/1998 |
| JP | 2001-269551 | 10/2001 |
| JP | 2003-053157 | 2/2003 |
| JP | 2003/053157 | 2/2003 |
| JP | 2003/205287 | 7/2003 |

| | | |
|---|---|---|
| SU | 1692626 | 11/1991 |
| WO | WO90/11120 | 10/1990 |
| WO | WO93/02779 | 2/1993 |
| WO | WO93/23152 | 11/1993 |
| WO | WO 94/11094 | 5/1994 |
| WO | WO96/07470 | 3/1996 |
| WO | WO97/06880 | 2/1997 |
| WO | WO98/28066 | 7/1998 |
| WO | WO 00/21890 | 4/2000 |
| WO | WO 00/09245 * | 2/2004 |

OTHER PUBLICATIONS

"Direct Solid-Liquid Separation Using Hollow Fiber Membrane in an Activated Sludge Aeration Tank" by K. Yamamoto; M. Hiasa; T. Mahmood and T. Matsuo; Wat. Sci. Tech. vol. 21, Brighton, pp. 43-54 (1989).

"Organic Stabilization And Nitrogen Removal In Membrane Separation Bioreactor For Domestic Wastewater Treatment" by C. Chiemchaisri, Y.K. Wong, T. Urase and K. Yamamoto, presented at Membrane Technology in Wastewater Management, Cape Town, Mar. 2-5, 1992.

"Optimal fiber spacing externally pressurized hollow fiber module for solid liquid separation", by Kiat, Yamoto et al., Water Science Technology vol. 26, pp. 1245-1254, (1992).

"Household membrane bioreactor in domestic wastewater treatment", by Chiemchaisri et al. Water Science Technology vol. 27, No. 1, pp. 171-178, (1993).

"Organic wastewater treatment by activated sludge process using integrated type membrane separation", by Futamura et al. Proceedings IDA and WRPC World Conference on Desalination and Water Treatment, Nov. 1993, vol. 1, pp. 223-230.

"Integrated membrane-filtration activated-sludge wastewater treatment system", by Onishi and Futamura Proceedings 1994 MIE International Forum and Symposium on Global Environment and Friendly Energy Technology, pp. 365-368.

"Integrated membrane filtration activated sludge wastewater treatment system", International Symposium on Fibre Science and Technology (ISF'94), Yokohama, Oct. 1994.

ZeeWeed 145 Product Data Sheet, Jun. 1994.

* cited by examiner

PLAN VIEW

SIDE VIEW

INVERTED CAVITY AERATOR FOR MEMBRANE MODULE

This application is (a) a continuation-in-part of U.S. patent application Ser. No. 10/171,997 filed Jun. 17, 2002 which is a is a continuation-in-part of U.S. patent application Ser. No. 10/061,108, filed Feb. 1, 2002 now abandoned, which is an application claiming the benefit under 35 USC 119(e) of U.S. Provisional application No. 60/278,007 filed Mar. 23, 2001; and, (b) a continuation-in-part of U.S. application Ser. No. 10/661,519 filed Sep. 15, 2003 which is a continuation of Ser. No. 09/849,573; filed May 4, 2001, U.S. Pat. No. 6,620,319 which is a continuation of Ser. No. 09/507,438 filed Feb. 19, 2000, U.S. Pat. No. 6,294,039 which is a division of Ser. No. 09/258,999 filed Feb. 26, 1999, U.S. Pat. No. 6,042,677 which is a division of Ser. No. 08/896,517, filed Jun. 16, 1997, U.S. Pat. No. 5,910,250 which is a continuation-in-part of Ser. No. 08/514,119, filed Aug. 11, 1995, U.S. Pat. No. 5,639,373, and a continuation-in-part of Ser. No. 08/690,045, filed Jul. 31, 1996, U.S. Pat. No. 5,783,083 which is an application claiming the benefit under 35 USC 119(e) of provisional Ser. No. 60/012,921, filed Mar. 5, 1996. All of the documents described above are incorporated herein in their entirety by this reference to them.

FIELD OF THE INVENTION

This invention relates to an aerator, aerating method and filtration system for immersed membranes.

BACKGROUND OF THE INVENTION

Aeration is used with immersed membranes to scour the membranes and to disperse areas of tank water having increased concentrations of rejected solids from near the membranes. An ideal aeration system for immersed membranes would scour the entire assembly of membranes with minimum energy use, cost and maintenance required to keep the aerators from plugging.

SUMMARY OF THE INVENTION

It is an object of the invention to improve on the prior art. Other objects of the invention include providing an aerator or aeration process for immersed filtering membranes or providing a membrane filtration system. The objects of the invention are met by the combination of features, steps or both described in the claims. The following summary may not describe all necessary features of the invention which may reside in a sub-combination of the following features or in a combination of some or all of the following features and features described in other parts of this document.

Various aspects of the invention are directed at an aerator having an aerator shell with openings for discharging bubbles from its upper surface and a shape capable of at least temporarily containing a variable volume of air in fluid communication with the openings for discharging bubbles. The shell is open to tank water such that the tank water can act on the volume of contained air and so that substrate can be displaced from or enter into the aerator as the volume of trapped air changes. The aerator shell is located so that discharged bubbles will rise through an assembly of filtering membranes. The shell may be a separate structure, such as an inverted box, or may be wholly or partially made of parts, for example headers, of modules of the filtering membranes. The aerator shell may be fed with air varying between a higher rate of air flow and a lower rate of air flow, which is one half or less of the higher flow rate, in short repeated cycles of between about 10 seconds and 100 seconds in duration, or between about 10 seconds and 60 seconds in duration. The lower rate of air flow may be an air off condition or be about 10% or less than the higher rate of air flow. Apparatus for providing such cycles are described in U.S. Pat. No. 6,245,239 which is incorporated herein by this reference to it.

Air may be provided to the aerator shell at the higher flow rate during about ⅛ to ½ of each cycle. When air is provided at a higher rate of air flow, the aerator traps a pocket of air which grows in volume and releases bubbles from its upper surface. When air is provided at the lower rate of air flow, the aerator may continue to release bubbles from its upper surface and the volume of the air pocket decreases. Bubbles may be released during about ⅓ to ⅔ of the cycle duration. The aerator may become partially or completely flooded during a later part of the lower air flow period to help remove accumulated solids. Alternately, bubbles may be produced throughout each cycle.

In other aspects of the invention, a filtration system, which may be used to extract drinking water from a water to be filtered, has one or more immersed membranes assemblies, or modules, located in a tank open to the atmosphere with the membranes immersed in the substrate. An inlet for adding substrate and an outlet for retentate are located so as to create a horizontal flow of substrate through the tank. Some or all of the retentate may be, but preferably is not, circulated to the inlet and a second outlet or other means for removing settled solids may be provided. The membrane assemblies are located within the horizontal flow of substrate and may be spaced or oriented to encourage the horizontal flow to carry solids in the substrate to the outlet. Aerators as described above are provided and operated as described above. The aerators may be comprised of parts of the membrane assemblies or located closely below the membrane assemblies since the horizontal flow of substrate reduces or eliminates the need for the tank water to circulate around the membrane assemblies.

BRIEF DESCRIPTION OF THE DRAWINGS

For a better understanding of the present invention, and to show more clearly how it may be carried into effect, reference will now be made by way of example to one or more embodiments illustrated in the following drawings in which.

DETAILED DESCRIPTION OF PREFERRED EMBODIMENT(S)

Figure 1:
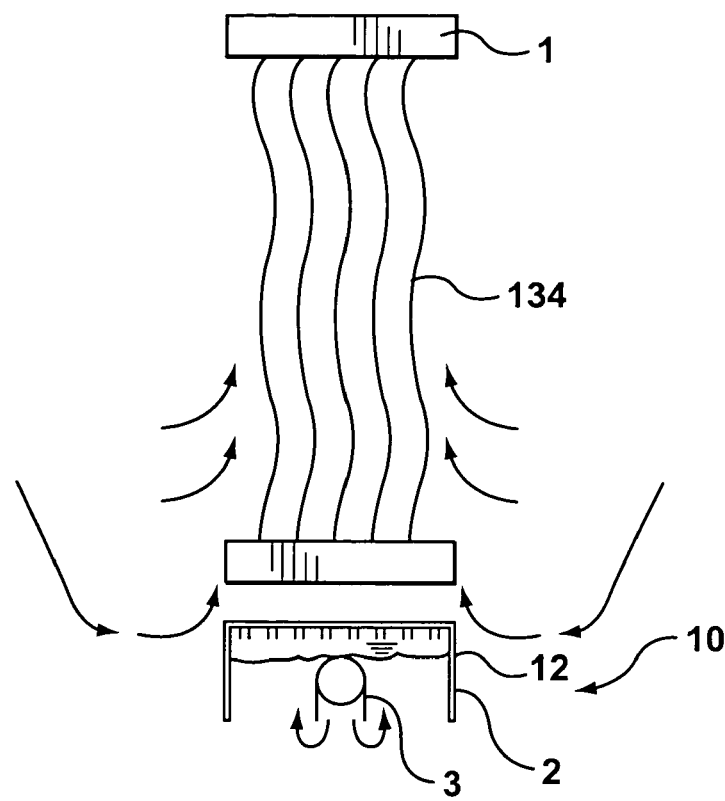
FIG. 1 is a schematic view of the side of a membrane assembly, and a first embodiment of an aerator.
Figure 2:
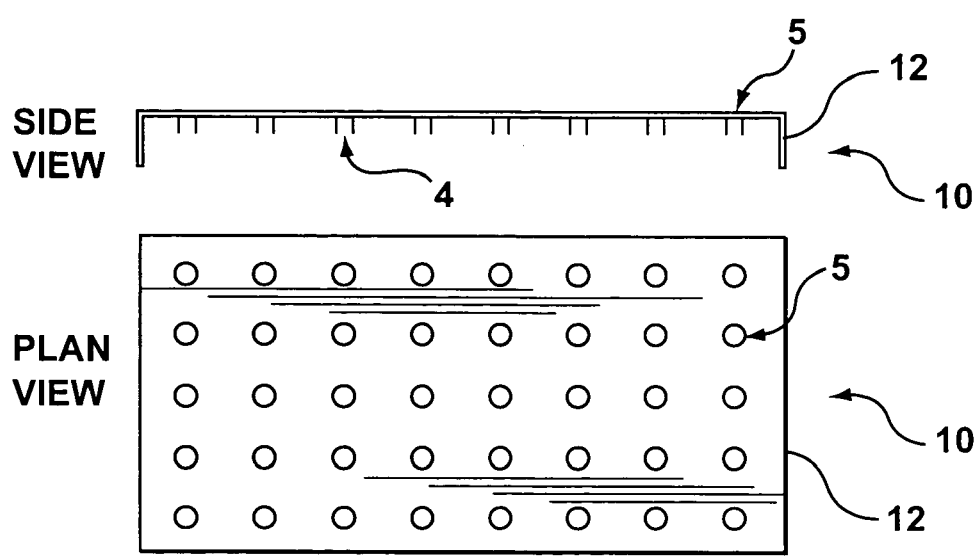
FIG. 2 is schematic top and side views of the aerator of FIG. 1.

FIGS. 1 and 2 show a first aerator 10 having an aerator shell 12 in the shape of an inverted box which will be called an air box 2. Referring to FIG. 1, the air box 2 is located below at least one membrane assembly 1. The first aerator 10 may also service a plurality of membrane assemblies 1, for example four to sixteen, or more, membrane assemblies 1. A space between the membrane assembly 1 and the air box 2 optionally promotes liquid recirculation through and about the membrane assembly 1. Alternately, the space may be reduced or eliminated to preserve space when the air box 2 is used with the filtration system described further below.

The air box 2 may be rectangular or other shapes capable of supporting holes 5 in desired locations in an upper surface, at least temporarily containing a variable volume of air in communication with the holes 5 and open to tank water so that tank water can be displaced from or enter into the air box 2 as the volume of contained air changes. The air box 2 may have horizontal dimensions to generally match the footprint of the membrane assembly 1 above it. The height of the side walls of the air box 2 are such that the air box 2 can contain a volume of air corresponding to the amount of air which is provided from an air distribution pipe 3 less the volume of air produced as bubbles through the holes 5, and nipples 4 if used, as will be described further below.

The air distribution pipe 3 is located as close as possible to the air box 2 to limit the height of the water column (or pressure) which must be overcome to eject air and thereby minimize energy required. The air distribution pipe may be located such that it discharges air directly inside the air box 2.

The air box 2 may be attached to the membrane assembly 1 which facilitates inspection when the membrane assembly is pulled out. Alternately, the air box 2 may be attached to the air distribution pipe 3 or attached to its own mounting apparatus.

The air distribution pipe 3 has at least one large aeration hole located under each air box 2. The size of the aeration holes in the air distribution pipe 3 may be chosen to minimize fouling, for example, very large holes may foul less rapidly. The air distribution pipe 3 may simultaneously supply air to several air boxes 2.

Referring to FIG. 2, the air box 2 upper surface has a series of air holes 5 arranged in a regular pattern. The hole size is such that the holes 5 do not plug from debris in water and produce bubbles of an appropriate diameter for scouring the membrane assembly 1, typically 5–15 mm. The density of holes 5 depends on design of the membrane assembly 1 and aeration requirements and may be 25 to 160 holes per square meter. The holes may be fitted with nipples 4 pointing downward to provide a residual air cushion in the air box 2 which promotes the rapid horizontal dispersion of air.

In operation, the rate of air flow in the air distribution pipe 3 varies in a repeated cycle having a total cycle length or duration of between about 10 and 100 seconds. In general, there is a period at a higher flow rate and a period at a lower flow rate. The lower flow rate is one half or less of the higher flow rate.

The lower flow rate may be 10% or less than the higher flow rate or the lower flow rate may an air off condition or have substantially no air flow. The period of higher flow may be between about ⅛ and ½ of the total cycle duration. Most often, the period of higher flow and period of lower flow are each about ½ of the cycle duration. The change between the higher flow rate and the lower flow rate is performed rapidly, i.e. in less than about 6 seconds or in less than about 3 seconds.

During the higher flow period, the air box 2 fills with air because the air flow from the air distribution pipe 3 is larger than the air flow from the air box 2 as bubbles which flow upwards to the membrane assembly 1.

The air box continues to discharge air bubbles through the holes 5 to scour the membrane assembly 1 during the lower flow period. The air box 2 may be sized in relation to the number and size of holes 5 and the flow rate and duration of air flow from the air distribution pipe 3 such that air flows through the holes 5 throughout each cycle. Alternately, the air box 2 may be sized to become empty of air during a part of the lower flow period which allows tank water to flow thorough the holes 5 or nipples 4 to wash away deposits left around the holes 5 or nipples 4.

Air cycling, meaning a flow of air that varies in rate as described above, may be provided to multiple, distinct groups of membrane assemblies 1 connected to 2 or more air distribution pipes 3 from a single air blower operated at a single rate. This is done by providing a plurality of air distribution pipes 3 which form or communicate with a plurality of distinct branches of an air distribution system. A valve set communicates between an air supply and the distinct branches. The valve set is operated to split an initial air flow from the air supply such that at any time at least one distinct branch receives air at a higher flow rate and at least one other of the branches receives air at a lower rate. The valve set switches which distinct branch or branches receives air at the higher flow rate and the lower flow rate in repeated cycles. This is described more fully in U.S. Pat. No. 6,245,239 which is incorporated herein in its entirety by this reference.

Because of the volume of air temporarily contained in the air box 2 during the high flow period, bubbles are produced for a greater portion of the cycle than the higher flow period. For example, if two distinct branches are provided, the higher flow period in each will be about ½ of the cycle duration but bubbles may be produced for between about ½ and ¾ of the cycle duration. Alternately, 4 distinct branches might be fitted to a single blower and each receive air at the higher flow rate for about ¼ of the cycle duration. Yet, because of the volume of air temporarily trapped in the air box 2, bubbles can be produced for about ⅓ to ½ of the cycle duration.

Benefits of the first embodiment include:

1. Avoid an aerator grid which requires a larger network of pipes.

2. Reduce the need to flush aerators with permeate to wash away deposits left by tank water entering the aerator as described in U.S. Pat. No. 5,944,997 issued on Aug. 31, 1999 to Pedersen et al.

3. Facilitates scale-up to aeration of a large set of membrane assemblies 1.

4. Decreases maintenance requirements since the air box 2 is easily cleaned and is generally self cleaning when permitted to flood periodically.

Figure 3:
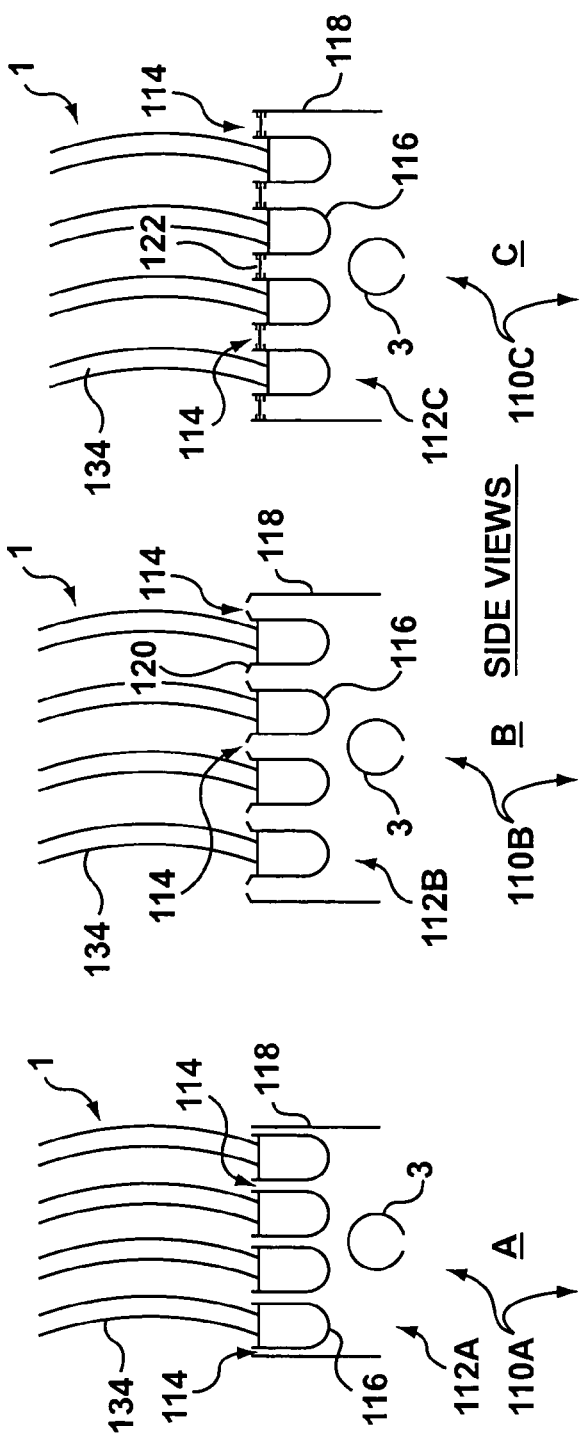
FIG. 3 is a schematic view of side and plan views of other embodiments of aerators partially or wholly made up of parts of membrane assemblies.
Figure 3:
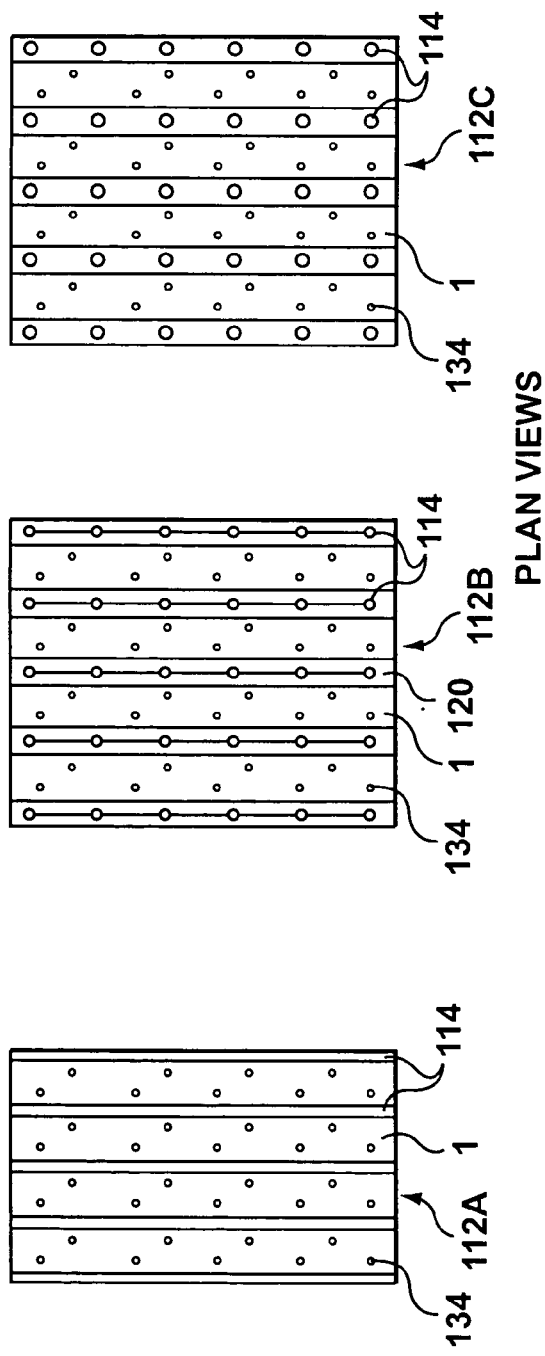

Three further embodiments, A, B and C, are shown in FIG. 3. These embodiments are like the first embodiment in many ways and the description of the first embodiment generally applies to them except for the differences noted below.

FIG. 3 shows second aerators 110A, 110B and 110C. Each has a second aerator shell 112A,B,C with openings 114 for discharging bubbles from their upper surfaces. The shape of the second aerator shells 112A,B,C allows them to at least temporarily contain a variable volume of air in fluid communication with the openings 114. The second aerator shells 112A,B,C are also downwardly open to allow tank water or substrate to act against any contained air. The openings 114 are located so that discharged bubbles will rise through a membrane assembly 1. Parts of the membrane assemblies 1, for example headers 116, form part of the second aerator shells 112A,B,C. Four membrane assemblies 1 are shown, but the second aerator shells 112A,B,C may be used with more membrane assemblies, ie. between four and sixteen, or more, membrane assemblies 1. Side walls 118 of the second aerator shells 112A,B,C may also be made as parts of the membrane assemblies 1. Flanges 120 on the headers 116 are also part of the second aerator shell 112B. Hole forming strips 122 between the headers 116 are part of the third aerator shell 112C. The hole forming strips may be made as part of the membrane assemblies 122. Air distribution pipes 3 are provided below the second aerators 110 as described above.

Figure 4:
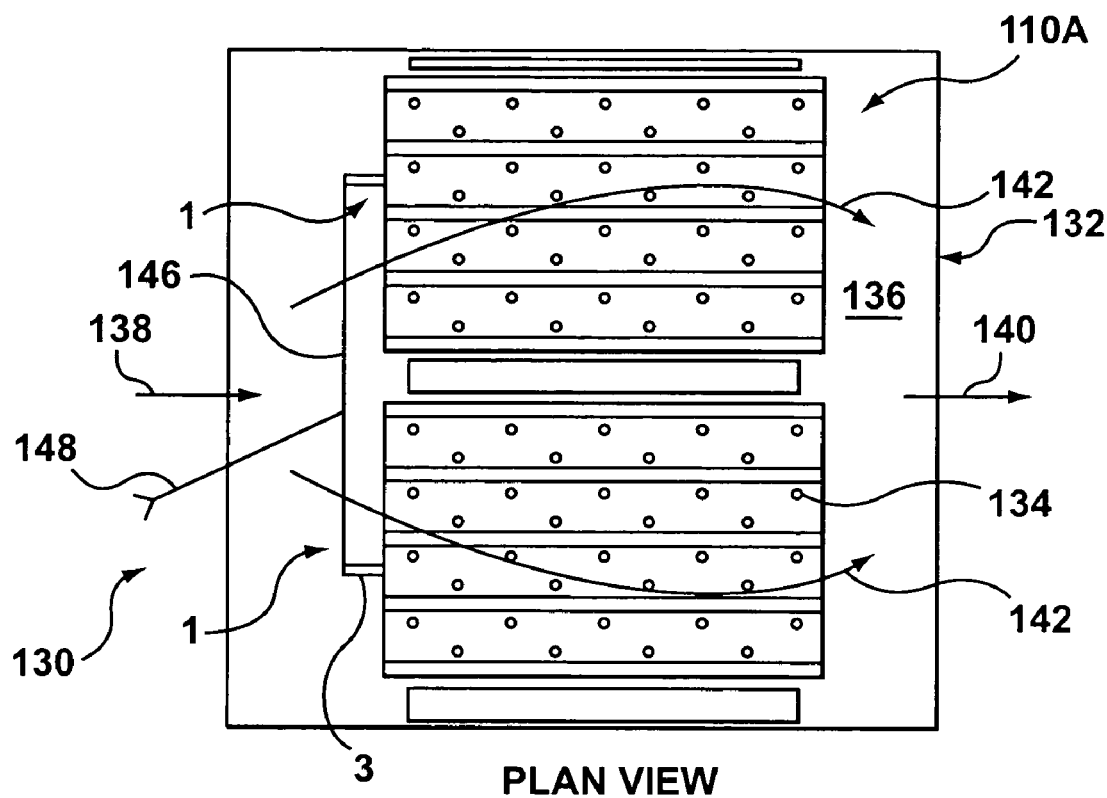
FIG. 4 is a schematic view of parts of a filtration system.
Figure 4:
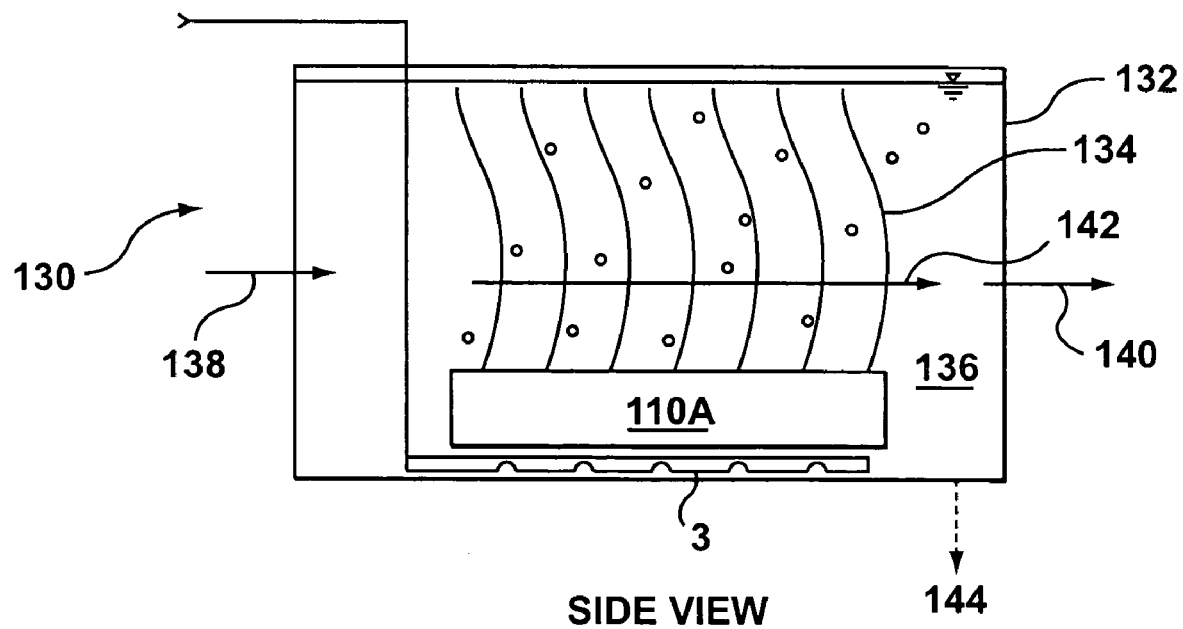

FIG. 4 shows a filtration system 130 having membrane assemblies 1 located in a tank 132 which is open to the atmosphere to immerse membranes 134 in a substrate 136. An inlet 138 for adding substrate 136 and an outlet 140 for retentate are located so as to create a horizontal flow of substrate 142 through the tank 132. Some or all of the retentate may be, but preferably is not, circulated to the inlet 138 and a second outlet 144 or other means for removing settled solids may be provided. The membrane assemblies 1 are located within the horizontal flow of substrate 142 and may be spaced or oriented to encourage the horizontal flow of substrate 142 to carry solids in the substrate to the outlet 140. For example, elongated membrane assemblies 1 may be oriented generally parallel with the horizontal flow of substrate 142. Second aerators 110A are shown although first aerators 10 or second aerators 110B,C may also be used. The aerators 10,110 are operated as described above. If first aerators 10 are used, they may be located closely below the membrane assemblies 1 since the horizontal flow of substrate 142 reduces or eliminates the need for substrate 136 to circulate around the membrane assemblies 1. Air is supplied to the aerators 10, 110 through air distribution pipes 3 connected to branches 146 of a cyclic aeration system 148.

Figure 5:
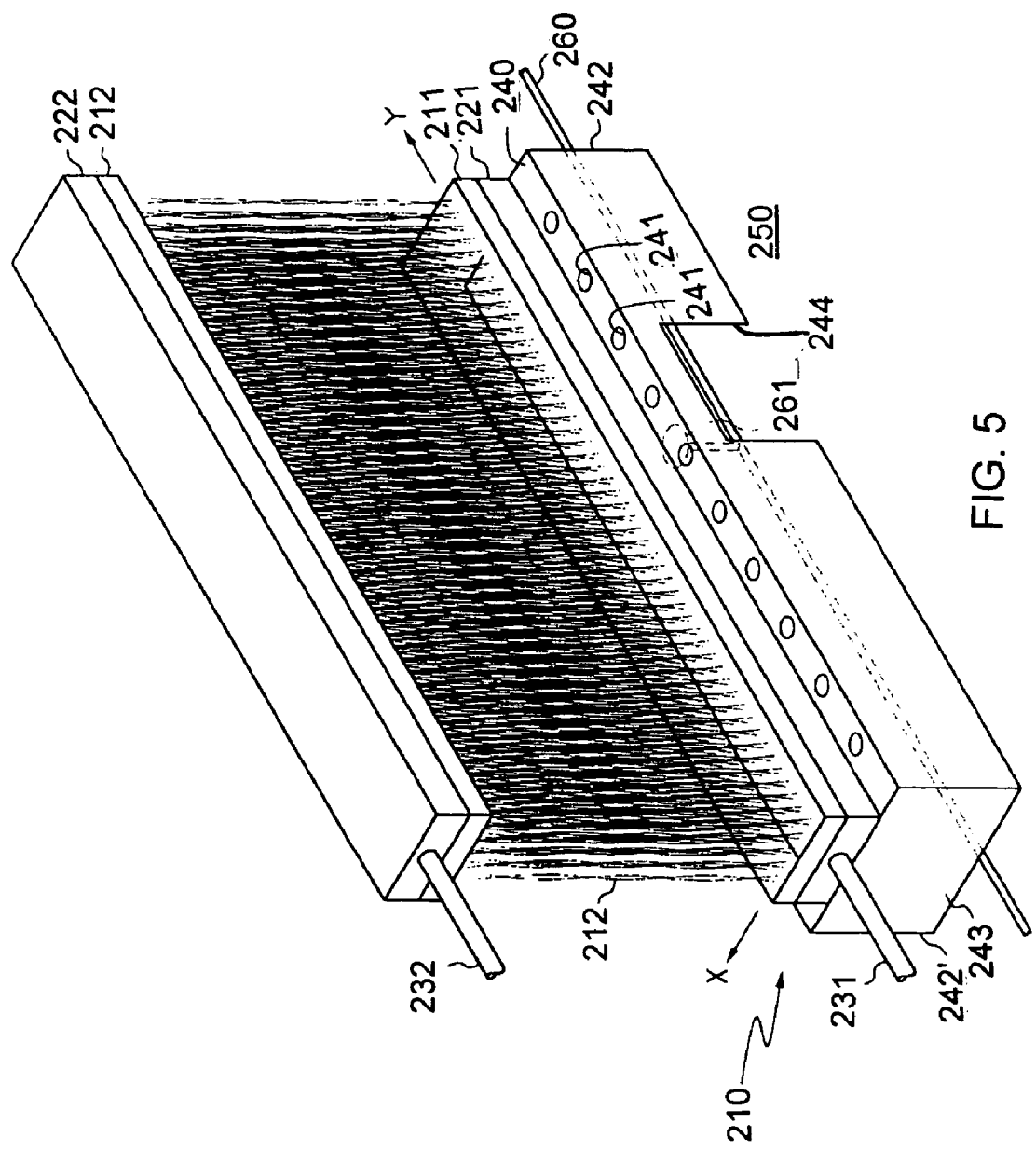
FIG. 5 is a perspective view illustrating a single skein (bundle of membranes) with its integral finished header and permeate collection pan supported on a conversion baffle held between opposed skirts of a shroud.

Referring to FIG. 5, there is shown a skein 210, or bundle of membranes, held between lower and upper headers 211 and 212, having lower and upper permeate collection pans 221 and 222, respectively, sized to snugly accommodate each header 211. The pan 221 is conveniently formed as a rectangular box having a base of substantially the same length and width dimensions as the header to which it is to be fitted. The pan 221 rests on a conversion baffle 240 having perforations 241 along the entire length on each side of the pan so that they extend over a major portion of the perimeter of the header 211; and, a V-shaped trough 246 (see FIG. 6) intermediate the oppositely disposed perforations 241. Preferably the pan 221 is removably secured to the baffle 240 with fastening means. The baffle 240 is held above the floor 250 by opposing sidewalls (or skirts) and preferably the baffle is formed integrally with a box-shaped shroud having opposed sidewalls 242 and 242' and opposed end walls 243, 243' (not visible) to confine bubbles provided from beneath the lower header. The sidewalls are high enough, typically 1 to 2 meters, to allow time for the oxygen in the air bubbles to dissolve in the water, and the sidewalls may have one or more openings 244 to facilitate circulation of substrate around the skein fibers 212.

Figure 6:
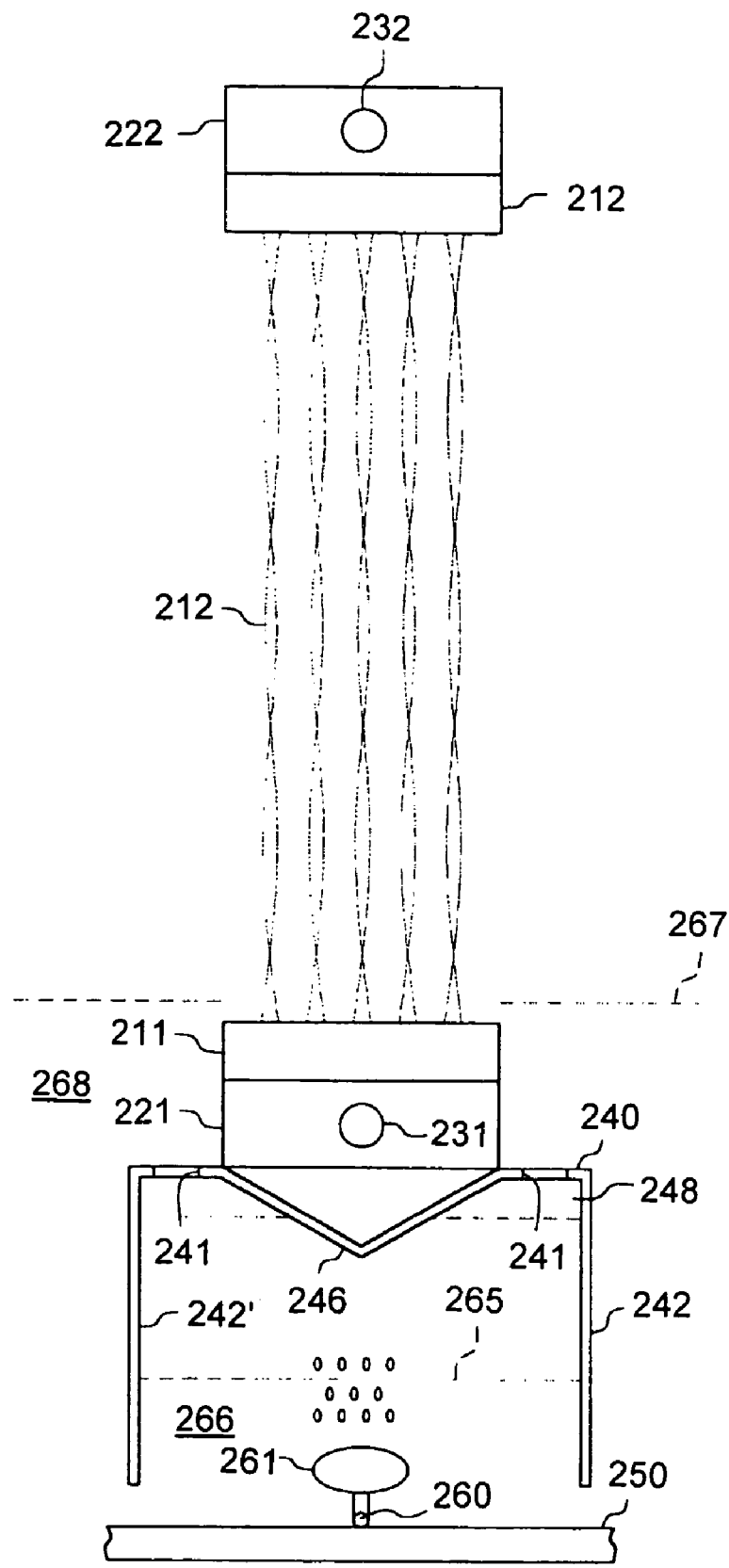
FIG. 6 is a cross-sectional view of the single skein shown in FIG. 5.

Referring further to the elevational cross-section view in FIG. 6, it is seen that within the sidewalls 242, 242' and end walls 243, 243', under the baffle 240 there is inserted an air supply pipe 260 resting on the floor of a tank, the pipe fitted with fine-bubble generators 261. The pan 221 rests above the V-shaped trough 246; the zone between the upper surfaces of the fine-bubble generators 261 and a phantom line indicated by reference numeral 265 is referred to as a fine-bubble discharging zone 266 within which the average diameter of the fine bubbles is measured. Upon travelling upwards, the fine bubbles are trapped as a relatively large mass of air in a trapping zone 248 directly below the baffle 240 and above the surface of the substrate, from which trapping zone the air exits through perforations 241 on either side of the header 211 upwardly along the skein fibers. The zone between the upper surface of the baffle 240 and a phantom line indicated by reference numeral 267 is referred to as a coarse-bubble discharging zone 268 within which the average diameter of the coarse bubbles is measured.

Permeate flows from the open ends of the fibers into the pans 221, 222 through permeate withdrawal conduits 231 and 232 which may be positioned in the sides of the pans as illustrated, in open flow communication with the inner portion of the pans. Whether operating under gravity alone, or with a pump to provide additional suction, it will be apparent that a fluid-tight seal is necessary between the peripheries of the headers 211, 212 and the upper portions of the pans 221, 222. Such a seal is obtained by using any conventional means such as a suitable sealing gasket or sealing compound, typically a polyurethane or silicone resin, between the lower peripheries of the headers 211 and the peripheries of the pans. When the skein is backwashed, backwashing fluid flows through the fibers and into the substrate.

Typically, from 3 to 30 skeins may be coupled together for internal fluid communication with one and another through the headers, permeate withdrawal means and the fibers; all the skeins may be air scrubbed concurrently using a common conversion baffle. Since the permeate withdrawal means is also used for backflushing it is generally referred to as a 'liquid circulation means', and as a permeate withdrawal means only when it is used to withdraw permeate.

Figure 7:
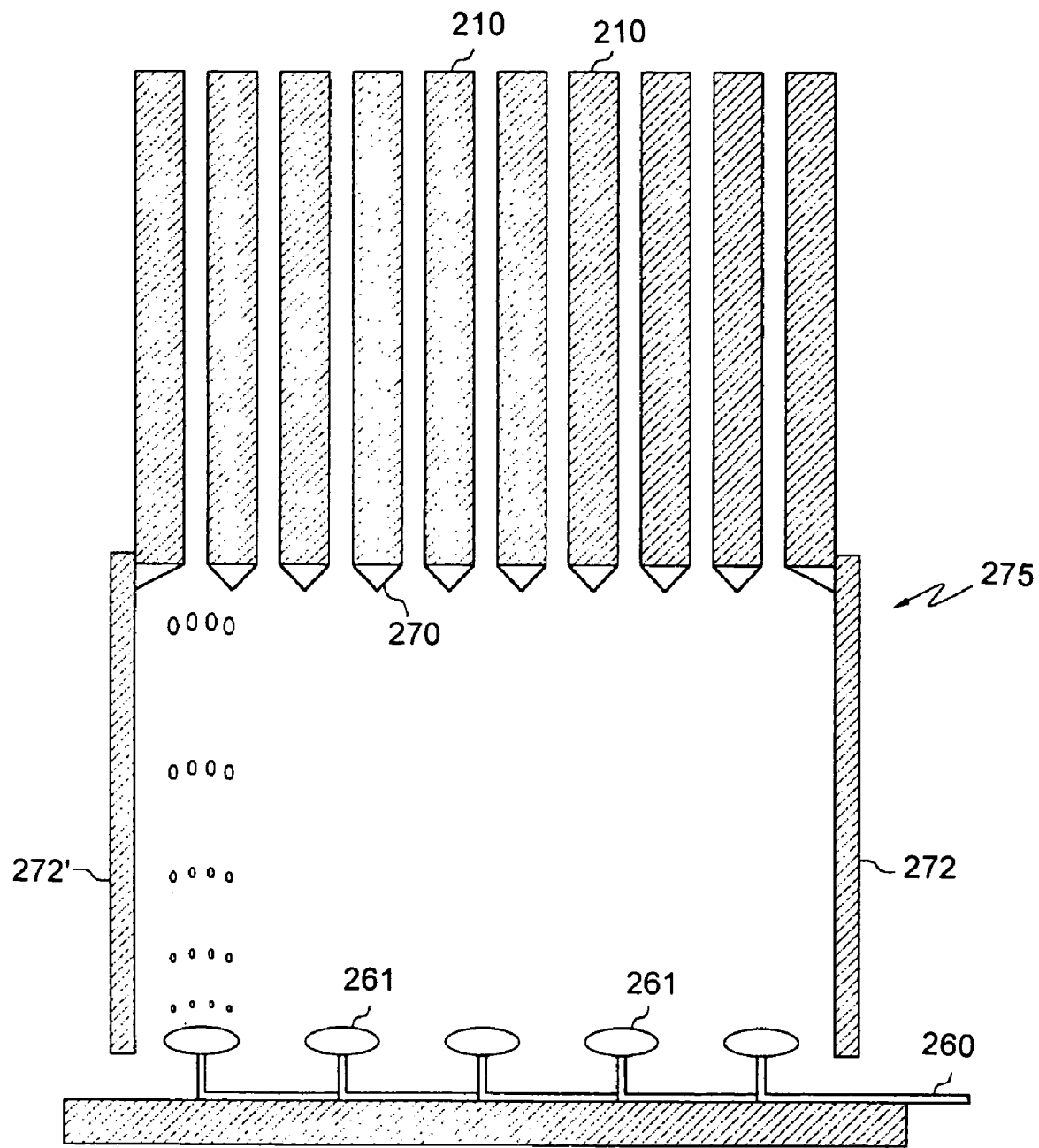
FIG. 7 is a cross-sectional elevational view schematically illustrating multiple skeins, each with an integral finished header and permeate collection pan disposed above a conversion baffle held between opposed skirts of a shroud.

Referring to FIG. 7 there is schematically illustrated a side elevational view of 10 skeins 210 with the lower header of each positioned over a V-shaped trough in a baffle 270. Multiple fine-bubble generators 261 are positioned in longitudinal rows between sidewalls 272, 272' of the shroud indicated generally by 275.

The type of gas (air) manifold is not narrowly critical provided it delivers fine bubbles in the amount necessary for the purpose at hand.

The air may be provided continuously or intermittently. The amount of air provided depends upon the type of substrate, the requirements of the type of microorganisms, if any, and the susceptibility of the surfaces of the fibers to be plugged, there always being sufficient air to produce desired growth of the microorganisms when operated in a substrate where maintaining such growth is essential.

Figure 8:
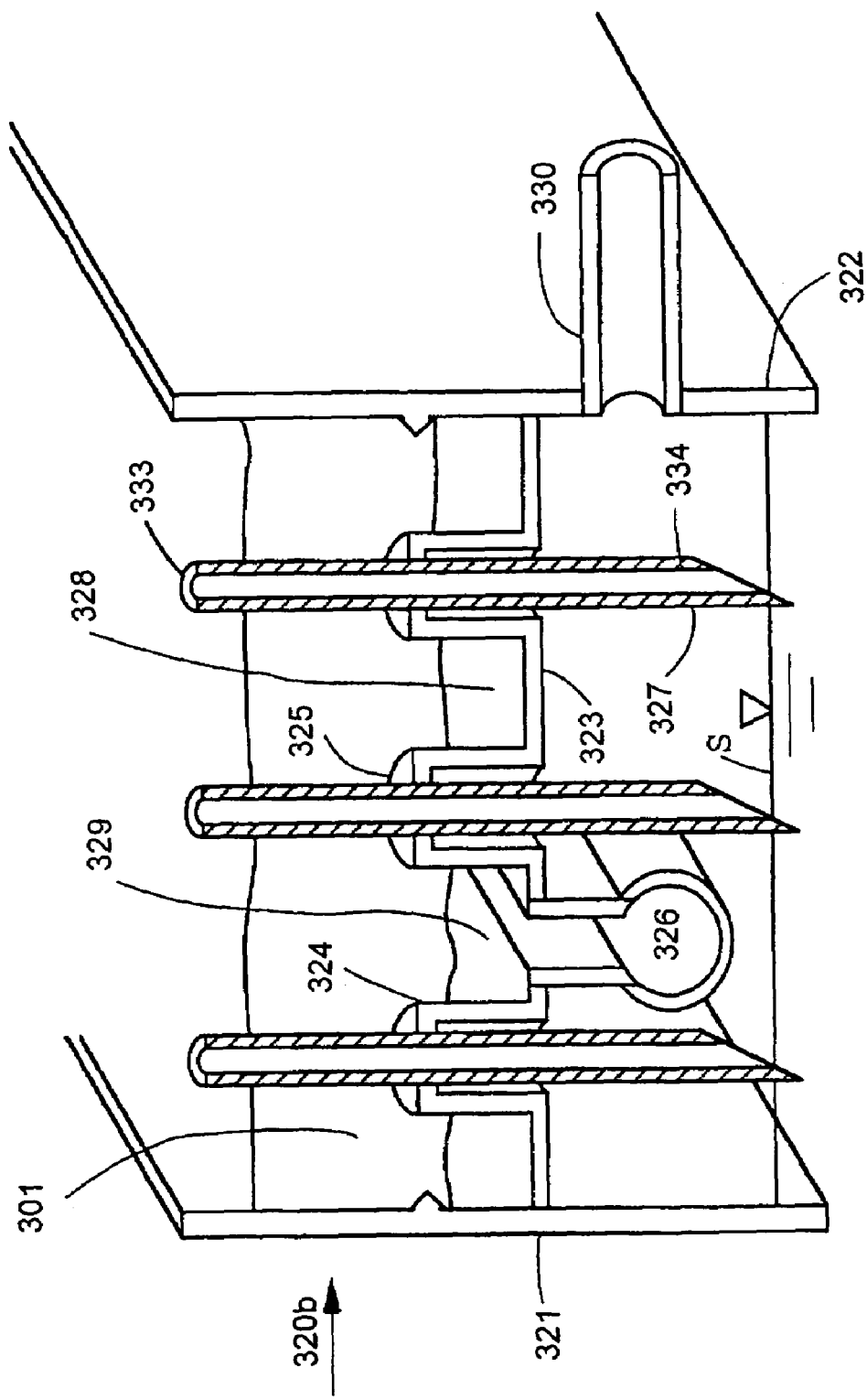
FIG. 8 is a perspective view of an integral finished header having plural skeins potted in a common header molded in an integral permeate collection means with air-tubes rising vertically through the header between adjacent skeins, and along the outer peripheries of the outer skeins.

Referring to FIG. 8 there is schematically illustrated, in a cross-sectional perspective view, an embodiment in which a bank of two skeins is potted in a single integral finished header enclosure, referred to generally by reference numeral

320b. The term "header enclosure" is used because its side walls 321 and 322, and end walls (not shown) enclose a plenum in which air is introduced. Instead of a permeate pan, permeate is collected from a permeate manifold which serves both skeins. Another similar upper enclosure 320u (not shown), except that it is a flat-bottomed channel-shaped pan (inverted for use as the upper header) with no air-tubes molded in it, has the opposed terminal portions of all the skein fibers potted in the pan. For operation, both the lower and upper enclosures 320b and 320u, with their skein fibers are lowered into a reservoir of the substrate to be filtered. The side walls 321 and 322 need not rest on the bottom of the reservoir, but may be mounted on a side wall of the reservoir.

The side walls 321 and 322 and end walls are part of an integrally molded assembly having a platform 323 connecting the walls, and there are aligned multiple risers 324 molded into the platform. The risers resemble an inverted test-tube, the diameter of which need only be large enough to have an air-tube 327 inserted through the top 325 of the inverted test-tube. As illustrated, it is preferred to have "n+1" rows of air-tubes for "n" stacks of arrays to be potted. Crenelated platform 323 includes risers 324 between which lie channels 328 and 329. Channels 328 and 329 are each wide enough to accept a stack of arrays of fibers 312, and the risers are wide enough to have air-tubes 327 of sufficient length inserted therethrough so that the upper open ends 333 of the air-tubes protrude from the upper surface of the fixing material 301. The lower ends 334 of the air-tubes are sectioned at an angle to minimize plugging, and positioned above the surface S of the substrate. The channel 329 is formed so as to provide a permeate withdrawal tube 326 integrally formed with the platform 323. Side wall 322 is provided with an air-nipple 330 through which air is introduced into the plenum formed by the walls of the enclosure 320b, and the surface S of substrate under the platform 323. Each stack is potted in the fixing material 301, for example by forming a composite header of fugitive PEG wax and epoxy resin around the stacks of arrays positioned between the rows of risers 324, making sure the open ends of the air-tubes are above the epoxy fixing material, and melting out the wax through the permeate withdrawal tube 326. When air is introduced into the enclosure the air will be distributed through the air-tubes between and around the skeins.

EXAMPLE 1

An aerobic biochemical treatment system has a daily capacity of 10,000 cubic meters of sewage with and oxygen demand of 500 mg/L representing a total oxygen demand of 5000 Kg/day. The bioreactor is a rectangular tank 25 meters long, 20 meters wide with a working depth of 6 meters. Microfiltration is carried out with 300 skeins, each 2 meters high and having 50 m$^2$ of surface. Each skein can process 1400 liters/hr using 30 cubic meters/hr of scouring air. All measurements of volume of air are given at standard conditions of 1 atm. and 20° C. at sea level.

The skeins are submerged so that their lower headers are about 2 meters below the surface of the liquid in the bioreactor. The aerators are positioned about 4 meters below the lower header.

The amount of air required to scour (or "air-scrub") all skeins is 216,000 m$^3$/day and this is most effectively accomplished with coarse bubbles.

The transfer efficiency in the bioreactor with coarse bubble aerators is 1% per meter of the depth below the skein that the coarse bubble aerator is positioned. The transfer efficiency with fine bubble aerators is 3% per meter of the depth below the skein that the fine bubble aerator is positioned.

In addition to the air required for scouring, the oxygen demand of the microbes must be supplied with additional air, referred to as "auxiliary air". In a bioreactor fitted with vertical skeins and no conversion baffle, so that all air is supplied as coarse bubbles, the auxiliary air required is 3 times greater than the auxiliary air supplied as fine bubbles (which transfer available oxygen 3 times more efficiently than the coarse bubbles at the same depth). Coarse bubbles are supplied with Aeroflow™ stainless steel coarse bubble diffusers, from Aeroflow Environmental Inc. Fine bubbles are supplied with Sanitaire™ flexible membrane tube diffusers available from Sannitaire Water Pollution Control Corp. and Elastox™ non-clog fine bubble rubber diffusers from Eimco Process Equipment Co. The trapping zone under the conversion baffle is estimated to be narrow, in the range from about 1 cm to about 5 cm in height.

The air requirements for the bioreactor using a conversion baffle and for the same bioreactor using coarse bubbles only, are set forth below, side by side. All volumes of air are set forth in the following Table 1, as standard cubic meters per day.

TABLE 1

|  | With Conv. Baffle | Coarse bubbles only |
|---|---|---|
| Air reqd. to scour all skeins | 216,000 | 216,000 |
| Air reqd. to provide oxygen demand | 68,000 | 204,000 |
| Total air reqd. | 284,000 | 420,000 |

It is evident that using a conversion baffle, as described in relation to FIGS. 5–7, yields a saving of nearly 50% in the cost of supplying air.

In each case permeate is withdrawn through lines connected to the collection pan of each header with a pump generating about 34.5 kPa (5 psi) suction. Permeate is withdrawn at a specific flux of about 0.7 lm$^2$h/kPa yielding about 4.8 l/min of permeate which has an average turbidity of <0.8 NTU, which is a turbidity not discernible to the naked eye.

Other embodiments of the invention may be made in alternate configurations and operated according to alternate methods within the scope of the invention which is defined by the following claims:

The invention claimed is:

1. A method of withdrawing a permeate from a substrate using a membrane immersed in the substrate comprising the steps of:
   (a) providing a reservoir containing a substrate at ambient pressure;
   (b) providing an assembly having a solid body, a hollow fiber membrane disposed generally vertically and attached to the solid body and a permeate collection means in communication with the inside of the membrane;
   (c) a structure having an upper portion, a wall or walls surrounding a space below the upper portion, and passages through the upper portion in communication with the space;
   (d) applying a suction to the permeate collection means to withdraw permeate from the substrate through the membrane; and, (e) while applying the suction, directing a gas to flow continuously or intermittently into the space so as to form a pocket of the gas at least temporarily in the space, the pocket of the gas having an interface with the substrate below the upper portion, such that at least a portion of the gas flows through the openings to provide bubbles which contact the membranes during the step of applying the suction.

2. The method of claim 1 wherein the structure extends horizontally below a plurality of said assemblies.

3. The method of claim 1 wherein the gas is flowed at a rate varying between a high flow rate and a lower flow rate in cycles of between about 10 seconds and 100 seconds in duration.

4. The method of claim 1 wherein the passages of the structure comprise air tubes that protrude downwardly from the bottom of the upper portion into the space.

* * * * *